A. SORGE, Jr.
LIQUID FLOW METER.
APPLICATION FILED MAR. 13, 1913.
1,258,268.
Patented Mar. 5, 1918.
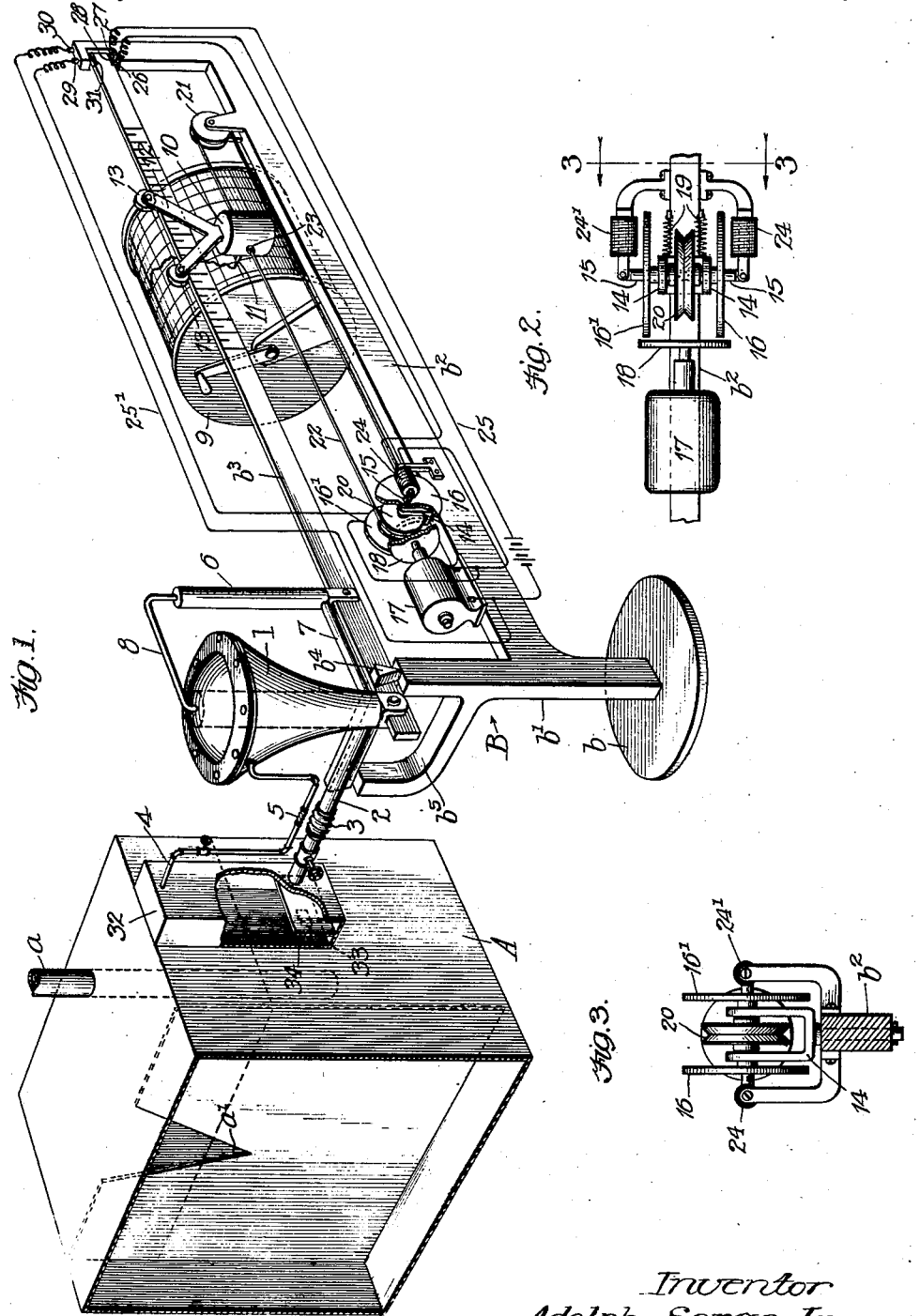
Inventor
Adolph Sorge Jr.

UNITED STATES PATENT OFFICE.

ADOLPH SORGE, JR., OF ST. JOSEPH, MICHIGAN.

LIQUID-FLOW METER.

1,258,268. Specification of Letters Patent. Patented Mar. 5, 1918.

Application filed March 13, 1913. Serial No. 753,960.

*To all whom it may concern:*

Be it known that I, ADOLPH SORGE, Jr., a citizen of the United States, and a resident of St. Joseph, in the county of Berrien and State of Michigan, have invented a certain new and useful Improvement in Liquid-Flow Meters, of which the following is a specification.

This invention relates to liquid measuring devices and relates particularly to the type of liquid measuring devices commonly known as "flow meters."

The object of the invention is to provide simple means in connection with a flow meter for accurately indicating both the rate of flow and the quantity of flow of a liquid.

To effect this object, a measuring device of my invention comprises the various features, combinations of features and details of construction hereinafter described and claimed.

In the accompanying drawing, in which my invention is fully illustrated—

Figure 1 is a perspective view of a liquid measuring device of my invention; and Fig. 2 is a fragmentary detail plan view of the means for operating the counterpoise for balancing the scale beam; and Fig. 3 is an end view thereof from the position 3—3, Fig. 2.

It has been found in practice that the most accurate results in measuring the rate and quantity of liquid flow by means of flow meters are obtained by use of triangular or V-shaped notches or weirs. The accepted formula for the flow of liquid over a triangular or V-shaped notch or weir is $Q$ equals $cH^{5/2}$, in which $Q$ is the quantity of liquid flowing over the weir per minute; $c$ an experimentally derived constant; and $H$ the head of liquid from the crest or vertex of the weir to the "still" surface of the liquid. My invention, however, contemplates the use of any desired form of weir, for which the value $Q$ for different values of $H$, having been ascertained, may be used.

In carrying out my invention, I propose to employ means for weighing a quantity of liquid proportioned directly to the total quantity of liquid which passes over the weir, together with means for recording said weight, said recording means preferably being constructed and arranged to provide a continuous record which will indicate variations in the rate of flow and from which the average rate of flow and the total quantity of liquid flowing over the weir during any unit of time may be readily ascertained. Having ascertained the weight of a known proportion of the liquid passing over the weir, the total quantity by weight may be ascertained by multiplication, which can be conveniently shown by properly marking the scale and record. For convenience of expression, I will describe my improved measuring device as though all the liquid passing over the weir were actually weighed, and to render the description definite, will assume that a triangular weir is used.

Stated broadly, the means for thus weighing the liquid which passes over the weir consists of a vessel or receptacle which is so shaped that the quantity of liquid contained therein will at all times conform to the said formula $Q$ equals $cH^{5/2}$, said vessel or receptacle being in open communication with the tank or liquid way, the flow from or through which it is desired to measure. This receptacle I mount on a suitable scale in such position that its lower end will be on a level with the crest of the weir and the depth of the liquid therein will be equal to the head of liquid over the crest of the weir measured from the "still" surface of said liquid.

In connection with said scale, I provide means for recording the weight of the liquid contained in said vessel or receptacle, preferably in the form of a continuous line traced by a movable point on a sheet of paper properly ruled to show all variations in the weight of the liquid contained in said vessel or receptacle, and from which the weight of liquid passing over said weir during any unit of time may be quickly and conveniently read or determined.

Referring now to the drawing, in which I have shown a simple apparatus adapted for indicating the rate and quantity of flow in accordance with my invention, A is a tank into which water flows through a supply pipe $a$, said tank, as shown, being closed, and being divided by a partition which is provided with a triangular or V-shaped discharge opening $a^1$, commonly known and hereinafter referred to as a "weir," and the vertex thereof being known and designated as the crest of the weir.

Mounted adjacent to the tank A is a weighing scale, designated as a whole B, the 110 frame of which comprises a base $b$, an upright standard $b^1$, a laterally extending arm $b^2$, and $b^3$ the scale beam, which is pivotally supported by means of a knife edge $b^4$, bearings for which are formed in the upper ends of the standard $b^1$ and of a bracket $b^5$ thereon.

Mounted on the scale beam $b^3$ is a vessel or receptacle 1, which is so positioned that its lower end will be on a level with the crest of the weir $a^1$ and is so shaped that its capacity for any depth of liquid contained therein shall conform to the formula for the quantity of liquid passing over the weir per minute, to wit, Q equals $cH^{5/2}$ in the case of triangular weirs.

The lower end of said vessel 1 is connected with the tank A below the crest of the weir, by a pipe 2, which comprises a flexible section 3 in order that said pipe shall not interfere with the action of the scale B. Said pipe 2 is sufficiently large that the level of liquid in the vessel 1 will adjust itself to the level of liquid in the tank A practically instantaneously.

Also, when the tank A and the receptacle 1 are closed, as shown, said vessel is connected at its upper end with the tank A above the designed liquid level therein by a pipe 4, thus maintaining the same pressure in said vessel as in said tank.

Said pipe 4 also comprises a flexible section 5 and the flexible sections both of said pipe 4 and of the pipe 2 are preferably located close together, in which position they will offer very slight resistance to the action of said scale beam, as the movement of the vessel 1 to which they are connected, will always be very slight, usually less than one one-hundredth of an inch.

The shape of the vessel or receptacle 1, in order that it may conform to the formula Q equals $cH^{5/2}$, is a matter of mathematical calculation and determination, and can readily be ascertained or platted by mathematicians familiar with work of this character. No attempt has therefore been made to ascertain the exact shape of said vessel or receptacle, which, as shown, is indicative merely.

It is obvious, however, that, if the shape of said vessel were to conform strictly to said formula, its lower end would terminate in a sharp point, which would render it impossible to make pipe connections thereto in the manner heretofore described. To overcome this objectionable feature, I prefer to increase the size of said vessel uniformly throughout its height, thus providing for making necessary pipe connections to the lower end thereof. This will, of course, increase the capactity of said vessel by a quantity equal to the size of the imaginary chamber formed within said vessel and the liquid contents of said vessel will be Q plus $v$, in which $v$ equals the quantity of liquid contained in said imaginary chamber.

With the described construction, it is obvious that the volume of liquid contained in the vessel 1, outside of the imaginary chamber therein, will vary with the head of liquid (H) according to the formula Q equals $cH^{5/2}$, and that, in recording the values of Q for different values of H, this can readily be done by providing means for recording the actual weight of liquid contained in the vessel 1 less the quantity of liquid contained in the imaginary chamber formed within said vessel. In practice, this can be done in a simple and very accurate manner by mounting a vessel 6 on the scale beam at the opposite side of the pivot bearing from the vessel 1, said vessel 6 being of such size and located at such distance from the pivot bearing of the scale beam that the contents thereof will always counterbalance the contents of the imaginary chamber formed within the vessel 1. Said vessel 6 is connected with the tank A in substantially the same manner as the vessel 1 is connected with said tank. As shown, said vessel 6 is connected directly with the vessel 1 by a pipe 7 which communicates with said vessels 1 and 6 on a level with the pipe 2. Also, when the tops of the tank A and the vessel 1 are closed, the top of said vessel 6 is closed and is connected with the tank A above the designed liquid level therein, as shown, by a pipe 8 which connects the upper end of the vessel 1 with the upper end of the vessel 6, thereby equalizing the pressures in the tank A and in the vessels 1 and 6.

The pipes 2 and 4 are provided with suitable valves by which communication between the tank A and vessel 1 may be controlled.

In connection with the scale B, I contemplate the use of any desired or approved form of apparatus for recording the weights of liquid in the vessel 1, less the weight of liquid contained in the imaginary chamber in said vessel, preferably as a continuous record expressed either in terms of the actual weight of liquid therein or a desired multiple thereof. There are many different forms of apparatus which could readily be adapted to this use, and I do not, therefore, desire to limit myself to any particular recording apparatus. For purposes of illustration, I have shown a simple form of recording apparatus which I will now describe:—Rotatably mounted in bearings formed in brackets on the lateral arm $b^2$ on the frame of the scale B, is a drum, to which rotation is adapted to be imparted by means of a clockwork, in a familiar manner, said clockwork being timed so that said drum will execute a complete revolution in any desired interval, a usual interval being twenty-four hours. Secured to the surface of the drum is a sheet of paper, which is ruled with lines extending both circumferentially and lengthwise of said drum 9, the spaces between the longitudinal lines representing intervals of time, and the spaces between the circumferential lines variations in weight of the contents of the vessel 1, exclusive of $v$, said circumferential lines being referred to a "base" or "zero" line, determined in a manner presently to be described.

Secured in the counterpoise 10, which is mounted on the scale beam $b^3$ so as to be freely movable lengthwise thereof, is a tracing point 11, which bears against the ruled sheet of paper on the drum 9, and operates to trace a continuous line thereon. As shown, said counterpoise 10 is supported by means of a carriage 12, mounted on wheels 13, which are adapted to run on the upper edge of the scale beam $b^3$.

The base or zero line on the paper wound on the drum 9 is traced by the point 11 when the counterpoise 10 is adjusted to exactly counterbalance the vessels 1 and 6 and associated parts, when the liquid in said vessels and their connections is level with the crest of the weir $a^1$.

As the quantity of liquid in the vessel 1 varies, my improved recording mechanism comprises means for imparting movement to the counterpoise 10 lengthwise of the scale beam $b^3$ to exactly counterbalance the liquid in said vessel above the level of the crest of the weir, exclusive of $v$, whereby said scale will at all times be maintained in equilibrium, and the exact weight of liquid in the vessel 1 corresponding to the formula $Q$ equals $cH^{5/2}$ recorded.

As shown, the means for thus imparting movement to the counterpoise 10 lengthwise of the scale beam $b^3$ are as follows:—Supported in a suitable bearing adjacent to the inner end of the lateral arm $b^2$ of the frame of the scale B so as to turn freely therein is a frame comprising spaced arms 14, rotatably mounted in which is a shaft 15 secured to rotate with which at opposite sides of the pivot bearing of said frame, are disks 16, $16^1$, and mounted on the lateral arm $b^2$ of the frame of said scale is a motor indicated at 17, secured to rotate with the shaft of which is a disk 18, the surface of said disk 18 being normally separated from the peripheries of the disks 16, $16^1$ by a short space and being maintained yieldingly in such position by means of suitable springs 19 applied to the frame 14 or an associated part.

Adjusted to a pulley 20 secured to rotate with the shaft 15 and to an idle pulley 21 rotatably mounted adjacent to the outer end of the arm $b^2$ is a belt 22 which extends freely through an opening formed through the counterpoise 10, and secured to which at opposite sides of said counterpoise and preferably closely adjacent thereto are buttons or the like 23, which, as said belt 22 is moved endwise over the pulleys 20 and 21, are adapted to engage the sides of said counterpoise 10 and to impart movement thereto with said belt.

While I have indicated the motor 17 as an electric motor, my invention contemplates the use of any desired form of motor. The motor 17 and the disk 18 driven thereby are designed to run continuously, and means are provided whereby movement of the scale beam $b^3$ corresponding to either an increase or decrease of the weight of the liquid contained in the vessel 1 will bring one or the other of the disks 16, $16^1$ into contact with the surface of the disk 18, the relation being such that travel of the belt 22 under the influence of the motor 17 will impart movement to the counterpoise 10 in proper direction to restore equilibrium of the scale beam, the movement of the counterpoise being outwardly when the weight of liquid contained in the vessel 1 increases, and being inwardly when the weight of the liquid in said vessel decreases.

As shown, contact of the disks 16, $16^1$ with the disk 18 is controlled by means of solenoids 24, $24^1$, supported in fixed position adjacent to opposite ends of the shaft 15, the armatures of said solenoids being connected to the ends of the shaft 15 in suitable manner to permit said shaft to rotate freely and said solenoids being connected with a source of electric supply by means of separate circuits represented diagrammatically at 25 and $25^1$, respectively, said circuit 25 comprising sections the ends of which are connected to insulated contacts 26 and 27 secured in a rigid support adjacent to the outer end of the scale beam $b^3$ and at its under side, said contacts 26 and 27 being adapted to be electrically connected by means of an insulated contact piece 28 secured to the under side of the scale beam $b^3$. Thus, when the end of the scale beam $b^3$ is depressed to bring the contact 28 into contact with the contacts 26 and 27, the circuit 25 will be closed, energizing the solenoid 24 and swinging the frame 14 to bring the periphery of the disk $16^1$ into contact with the disk 18, which will operate in an obvious manner to rotate said disk $16^1$ and shaft 15, the relation being such that the direction of rotation will operate to move the counterpoise 10 inwardly on the scale beam $b^3$. In like manner, the circuit $25^1$ comprises sections which are connected to insulated contacts 29 and 30, and is adapted to be closed and broken by means of an insulated contact 31 on the upper side of the scale beam $b^3$, which is adapted to contact with the inner ends of the contacts 29 and 30 when said scale beam rises, the closing of said circuit $25^1$ operating to energize the solenoid $24^1$, thus bringing the disk 16 into engagement with the disk 18 and operating to move the counterpoise 10 outwardly on the scale beam $b^3$. With the described construction, it is obvious that movement of the counterpoise, when said scale beam $b^3$ is lowered or raised to close the circuits 25, $25^1$, will continue until said counterpoise 10 is moved a sufficient distance to restore the scale to equilibrium and move said scale beam $b^3$ to break the closed circuit, which will cut out the solenoid in said circuit, whereupon the springs 19 will operate to restore the frame 14 to normal position with both disks 16 and $16^1$ out of contact with the disk 18.

With the described construction, it is obvious that the weight recorded by the tracing point 11 will be the weight of the entire quantity of liquid contained in the vessel 1 or a predetermined multiple thereof, exclusive of the liquid contained in the imaginary chamber formed in the vessel 1, as heretofore explained, and the total and average weight of said liquid may be readily ascertained by means of a planimeter, or any of the well known integrating devices, which, if desired, can be readily applied as an attachment to my improved measuring apparatus.

To prevent the accumulation of sediment in the vessels 1 and 6, and where the apparatus is used for weighing hard water or the like, to prevent the formation of scale on the inner surfaces of said vessels 1 and 6, means are provided for preventing any change or replacement of the liquid contained in said vessels 1 and 6. As shown, this is done in the following manner:— Formed on one side of the tank A is a closed chamber 32 with which the pipe 2 communicates directly. Said chamber communicates with the interior of the tank A on the upstream side of the weir $a^1$ by means of an opening 33, the upper side of which is below the level of the weir $a^1$. Extending across the chamber 32 between the opening 33 and the pipe 2, is a partition 34, the upper edge of which is level with the crest of the weir $a^1$. Thus, in order that any water entering the chamber 32 through the opening 33 may enter the vessel 1, it will be necessary for said water to rise a sufficient distance to pass over the top of the partition 34. In practice, the variation in the level of the water in the tank A will usually be slight, and it will therefore be necessary to locate the opening 33 only a comparatively short distance below the top of the partition 34. Any desired variation may, however, be readily provided for by locating said opening 33 a sufficient distance below the top of said partition 34. With the described construction, it is obvious that the space outside of the partition 34 will form in effect a well of dead water, which will be unchanged by variations of the level of the water in the tank A.

In many applications, my improved measuring device may be used without the recording device, scale readings being taken at intervals and noted for reference.

I claim:—

1. A flow meter for liquids comprising a weir, a scale, a vessel on said scale shaped to conform to the formula for the liquid flow over said weir, means providing connection between the up-stream side of said weir and said vessel, and means for recording the weight of liquid in said vessel, substantially as described.

2. A flow meter for liquids, comprising a weir, a scale, a vessel on said scale shaped to conform to the formula for the liquid flow over said weir, means providing connection between the up-stream side of said weir and said vessel, and means for balancing said scale, substantially as described.

3. A flow meter for liquids comprising a weir, a scale, a vessel on said scale shaped to conform to the formula for the liquid flow over said weir, means providing connection between the up-stream side of said weir and said vessel, and means for balancing said scale controlled by the action of the scale under varying weights of liquid, substantially as described.

4. A flow meter for liquids comprising a weir, a beam scale, a vessel mounted on the beam of said scale, shaped to conform to the formula for the liquid flow over said weir, means providing connection between the up-stream side of said weir and said vessel, and means for balancing said scale controlled by the scale-beam in response to the motion of said beam, substantially as described.

5. A flow meter for liquids comprising a weir, a scale, a vessel on said scale shaped to conform to the formula for the liquid flow over said weir, means providing connection between the up-stream side of said weir and said vessel, means for balancing the scale, and means for recording the weight of liquid in said vessel, substantially as described.

6. A flow meter for liquids comprising a weir, a scale, a vessel thereon comprising an imaginary chamber, and the space within said vessel outside of said imaginary chamber conforming to the formula for the liquid flow over said weir, a second vessel on said scale, the weight of the liquid contents of which counterbalances the weight of the liquid contents of the imaginary chamber in said first vessel, and means providing connections between said vessels and the up-stream side of said weir, substantially as described.

7. A flow meter for liquids comprising a weir, a scale, a vessel on said scale shaped to conform to the formula for the liquid flow over said weir, and means providing a flexible connection between the up-stream side of said weir and said vessel, substantially as described.

8. A flow meter for liquids comprising a weir, a beam scale, a vessel on the beam of said scale shaped to conform to the formula for the liquid flow over said weir, means providing connection between the up-stream side of said weir and said vessel, and means for balancing said scale, said means comprising a counterpoise mounted on said scale-beam so as to be freely movable endwise thereof, a motor, and operative connecting means between said counterpoise and motor constructed and arranged to impart movement to said counterpoise endwise of said beam, in opposite directions as said beam moves up and down, respectively, substantially as described.

9. A flow meter for liquids comprising a weir, a beam scale, a vessel on the beam of said scale shaped to conform to the formula for the liquid flow over said weir, means providing connection between the up-stream side of said weir and said vessel, and means for balancing said scale, said means comprising a counterpoise mounted on said scale-beam so as to be freely movable endwise thereof, a motor, a shaft at one side of said counterpoise, a pulley secured to rotate therewith, and an idle pulley at the opposite side of said counterpoise, a belt adjusted to said pulleys and which passes freely through a hole formed in said counterpoise, buttons on said belt at opposite sides of said counterpoise, and means for operatively connecting said pulley shaft with said motor shaft constructed and arranged for imparting rotation to said pulley shaft in opposite directions as said scale-beam moves up and down, respectively, substantially as described.

10. A flow meter for liquids comprising a weir, a beam scale, a vessel on the beam of said scale shaped to conform to the formula for the liquid flow over said weir, means providing connection between the up-stream side of said weir and said vessel, and means for balancing said scale beam, said means comprising a counterpoise mounted on said scale beam so as to be freely movable endwise thereof, a motor, and means providing operative connection between said counterpoise and motor constructed and arranged to impart movement to said counterpoise endwise of said beam in opposite directions as said beam moves up and down, means for maintaining said connecting means between the counterpoise and motor normally disengaged from said motor, and electrical means for effecting engagement of said connection, comprising separate electrical circuits, each comprising sections connected to contacts arranged in pairs above and below said scale beam, and switches for closing said circuits, respectively, controlled by movement of said scale beam in opposite directions.

11. A flow meter for liquids comprising a weir, a beam scale, a vessel on the beam of said scale shaped to conform to the formula for the liquid flow over said weir, means providing connection between the up-stream side of said weir and said vessel, means for balancing said scale, said means comprising a counterpoise mounted on said scale-beam so as to be freely movable endwise thereof, a recording cylinder rotatably mounted adjacent to said scale beam, and a tracing point secured in said counterpoise for tracing a line on said recording cylinder, substantially as described.

12. A flow meter for liquids comprising a weir, a scale, a vessel on said scale shaped to conform to the formula for the liquid flow over said weir, means providing connection between the up-stream side of said weir and said vessel, and means for forming a well of dead liquid on the up-stream side of said weir with which the connecting means to said vessel communicates directly, substantially as described.

13. A tank, a supply pipe therefor, a partition in said tank provided with a weir, a scale, a vessel on said scale shaped to conform to the formula for the liquid flow over said weir, said tank and vessel being closed to the air, means providing connection between the tank and vessel below the designed liquid level in said tank, and means providing connection between said tank and said vessel above the designed liquid level therein, substantially as described.

14. A tank, a supply pipe therefor, a partition therein provided with a weir, a scale, a vessel on said scale shaped to conform to the formula for the liquid flow over said weir, a chamber on said tank provided with an admission opening which communicates with said tank below the crest of the weir, said tank, vessel and chamber being closed to the air, means providing connection between said chamber and the vessel mounted on said scale, and a partition in said chamber between the admission opening and the pipe connection thereto, the top of said partition being level with the crest of the weir, substantially as described.

15. In flow measuring apparatus, the combination of a weir over which the liquid to be measured flows, a substantially stationary receptacle comprising an imaginary chamber, provisions for maintaining liquid therein to the height of the liquid level on the supply side of the weir, said receptacle being so shaped with respect to the law of flow over the weir that the quantity of liquid contained by said receptacle in the space outside of the imaginary chamber bears a constant ratio to the varying flow over the weir, and means for measuring the quantity of the liquid in said receptacle outside of said imaginary chamber, substantially as described.

16. In flow measuring apparatus, the combination of a weir over which the liquid to be measured flows, a substantially stationary receptacle comprising an imaginary chamber, provisions for maintaining liquid therein to the height of the liquid level on the supply side of the weir, said receptacle being so shaped with respect to the law of flow over the weir that the weight of the liquid contained by the receptacle in the space outside of the imaginary chamber bears a constant ratio to the varying rate of flow over the weir, and means for measuring the varying weight of the liquid in said receptacle outside of said imaginary chamber, substantially as described.

In testimony that I claim the foregoing as my invention, I affix my signature in presence of two subscribing witnesses this 7th day of March A. D., 1913.

ADOLPH SORGE, JR.

Witnesses:
MARY H. BIXEL,
F. J. WHITE.